United States Patent [19]

Brown

[11] Patent Number: 4,734,149
[45] Date of Patent: Mar. 29, 1988

[54] APPARATUS FOR HEATSEALING GELATIN CAPSULES CONTAINING A MEDICAMENT

[75] Inventor: Charles F. Brown, Joanna, S.C.

[73] Assignee: Warner-Lambert Company, Morris Plains, N.J.

[21] Appl. No.: 28,821

[22] Filed: Mar. 20, 1987

[51] Int. Cl.$^4$ .............................................. B32B 31/26
[52] U.S. Cl. ........................................ 156/381; 34/182; 34/236; 53/478; 53/485; 156/69; 156/498; 156/499
[58] Field of Search .................... 34/182, 236; 118/20, 118/24, 303; 156/69, 498, 499, 305, 381, 382; 209/913; 427/3; 53/478, 485

[56] References Cited

U.S. PATENT DOCUMENTS

| | | | |
|---|---|---|---|
| 3,775,863 | 12/1973 | Updegrove | 34/182 X |
| 3,905,127 | 9/1975 | Davis | 34/182 |
| 4,539,060 | 9/1985 | Wittwer et al. | 156/69 X |
| 4,656,066 | 4/1987 | Wittwer | 156/305 X |

OTHER PUBLICATIONS

Instruction Manual for Capsule Polisher CD-100, Acta Pharmacal Equip. Co.

Primary Examiner—Robert A. Dawson
Attorney, Agent, or Firm—Howard Olevsky; Stephen Raines

[57] ABSTRACT

Improved apparatus for heat-treating gelatin capsules containing a medicament to cause heat-seal of the telescoped cap and body wall portions thereof, the apparatus comprising a housing defining an elongate generally cylindrical passageway sloping downwardly from inlet to outlet for receiving and discharging capsules passing therethrough, a capsule conveyor comprising an elongate rotatable shaft mounted on the longitudinal cylindrical axis of the passageway for rotation and carrying a plurality of generally circular conveyor plates, each plate supportably mounted in spaced relation along the shaft and having extending ramp portions communicating with the top surface of the next adjacent plate in the direction of the housing passageway outlet to define a generally Archimedean screw-shaped path for passage of gelatin capsules through the housing passageway from inlet to outlet, air-distributing means comprising an elongate manifold attached to the housing having a first section communicating with the passageway along the first portion of its length and a second section communicating with the passageway adjacent the passageway outlet. Conduits are provided for connecting the first and second sections of the manifold to an air blower and air heater to circulate and recirculate heated air through the housing passageway to thermally treat capsules passing therethrough. The blower, heater, and a motor for rotatably driving the shaft of the conveyor plates may be variably adjusted to control the amount of thermal energy imparted to the capsules to effectively seal their cap and body overlapped wall sections to prevent separation of the cap and body without destruction of the capsule.

9 Claims, 6 Drawing Figures

APPARATUS FOR HEATSEALING GELATIN CAPSULES CONTAINING A MEDICAMENT

This invention relates to improved method and apparatus for the continuous conveyance and heat treatment of gelatin capsules containing a medicament to effect sealing of the cap and body portions thereof to facilitate their tamper-resistance, and, more particularly, to such improved method and apparatus for heat treatment of hard gelatin capsules previously treated with a sealing fluid, such as an alcohol and water mixture, to seal the overlapping cap and body side walls of the capsules and prevent their separation without substantial destruction of the capsules.

BACKGROUND OF THE INVENTION

Pharmaceutical compositions and medicaments typically are orally ingested in liquid, tablet, and capsule form. The capsule form of medication is considered to many to be a preferred form of dosage since the recepient users perceive them as having no aftertaste, being easy to swallow, causing no indigestion, and working quickly. Such capsules generally consist of a hard shell composed of two prefabricated cylindrical parts (a cap and a body), one end of each of which is rounded and closed, and the other end of which is open. A medicament or medicaments, usually in paste, liquid, or powder form, are filled into the body which is then joined with a cap to close the capsules. The hard shell capsules generally are made of gelatin or other materials whose properties are pharmaceutically acceptable.

The standard gelatin capsule in which the side wall of the body of the capsule is telescopically received within the smooth cylindrical side wall of the cap can be readily re-opened after filling, providing the possibility of contamination by insertion of other materials which may be harmful or undesirable for ingestion. One solution to prevent re-opening of capsules after filling has been to band the joined cap and body of each capsule at their seam of overlap with a gelatin band or film. This involves contact of each capsule by a liquid gelatin-coated roller to apply the band thereto. As an alternative to capsule banding, the smooth side walls of the cap and body of the capsules have been shape-modified by provision of mating circular grooves and ridges to achieve a "snap-fit" securement of the cap and body resistant to re-opening of the same. Capsules having structurally modified cap and body wall configurations are commercially available and sold by Capsugel division of Warner-Lambert Corporation under the trademarks Snap-Fit TM, Coni-Snap TM, and Coni-Snap Supro TM.

While such shape-modified cap and body structures provide better securement and make the capsules more difficult to open after joining, tamper-resistance and security of medicinal capsules may be further improved by sealing the overlapping walls of the caps and the bodies after filling. Several techniques have been employed for sealing of hard gelatin capsules, including wetting the overlapping contiguous faces of the cap and body side walls of the filled capsules with a special melting-point-lowering liquid which is believed to act to dissolve the amorphous part of the gelatin between the overlapped side walls, lower the glass transition temperature of the gelatin, and depress the melting-point of the crystalline part of the gelatin. The wetted capsules are then thermally treated to cause final heat-sealing and bonding of their overlapped side wall portions.

Such wetting liquids must be readily ingestible, available, and applied to the capsules. A number of wetting liquids and their methods of application to gelatin capsules are disclosed and described in U.S. Pat. No. 4,539,060 to Wittwer et al., and in co-pending U.S. patent application Ser. No. 06/582,364 filed Feb. 22, 1984 and now U.S. Pat. No. 4,656,066. A preferred wetting liquid is a mixture of water and an alcohol, such as ethanol, two solvents which are frequently and commonly used in the manufacture of pharmaceutical products. The selection of the type and ratio of the components of the wetting liquid depends upon the composition of the capsule wall, the type of printing on the capsule, and the amount of thermal energy to be applied during final heat-sealing of the cap and body walls to prevent their being opened after sealing without destruction of the capsule itself.

The most effective sealing of capsules is believed achieved by using a sealing fluid placed within the area of the capsule side walls defined by the overlapping contiguous cap and body side wall, followed by thermal treatment to effect a final bonding of the cap and body side walls. One commercially available method for sealing hard gelatin capsules so that they cannot be opened without visible destruction is known as the Licaps TM capsule-sealing process developed by Capsugel. This process involves wetting the wall contact area between the cap and body with a melting-point-lowering liquid, such as ethanol and water. If the capsules are wetted by immersion in the wetting liquid to cause the flow of the wetting liquid between the contiguous side walls of the cap and body by capillary action, excess wetting liquid must be removed from the outer walls of the capsule in suitable manner, as by air-drying or mechanical agitation, to avoid possible damage to the capsule in subsequent heat-treating operations. After removal of the excess wetting liquid, the cap and body sections are then thermally sealed into one capsule unit.

Aforesaid U.S. Pat. No. 4,539,060 discloses various apparatus for wetting, drying, and thermally sealing gelatin capsules. Certain of the apparatus consists of a continuous conveyor having net or wire mesh baskets into which capsules are ejected from a capsule-filling machine. The capsules are randomly oriented in the baskets which are dipped into a tank of sealing fluid to place the wetting liquid in the overlapped portion of the cap and body side walls by capillary action. Thereafter, the capsules are conveyed through a drying stream of conditioned air from a blower to remove excess sealing fluid from the surface of the capsules to avoid deformation and sticking of the capsules during subsequent thermal treatment. The surface-dried capsules are then heated by a specific source and quantity of thermal energy, such as in a kiln, an oven, or hot-air dryer.

Another apparatus for drying and thermal treatment of wetted capsules to seal the same is a conveying and heating apparatus sold by Glatt GmbH with offices at D-7851 Birozer, Germany BRD. This apparatus consists of combined stations for wetting, draining off or drying of excess wetting agent, and thermally sealing the dried-off capsules. The capsules, after spraying or immersion to wet the same, are conveyed by a helical or screw-type conveyor through a porous or mesh passageway as excess wetting liquid is drained from the capsules. The capsules, after draining, are alternately fed from the draining-off device to parallel-arranged, fluidized bed dryers. The two dryers are alternately programmed to first dry a batch amount of collected capsules by passage of air therethrough, and thereafter subject the dried capsules to heated air to impart thermal energy to the capsules sufficient to produce final of the overlapped side walls of the caps and bodies thereof.

The sealing machine alternatively may comprise a rotating conical wire mesh basket in which a wetting liquid is sprayed on the entire outer surface of the capsules as they are continuously fed therethrough. Capillary action causes transfer of some of the wetting liquid to the area between the overlapped side walls of the cap and body of each capsules. Excess wetting liquid is removed from the capsules as they approach the exit end of the basket, both by mechanical drainage and application of room-temperature air. From the liquid applicator basket, the capsules are then directed alternately, in batchwise manner, to the two drying and sealing chambers in the form of fluidized beds. Since two chambers are available, the sealing machine operates to fill the chambers in alternating fashion, so that conditioned cool air is first passed through each chamber during capsule-filling to further dry the capsules, while heated air is thereafter passed through each chamber after it is filled to thermally seal the capsules. The excess wetting liquid, generally comprising a mixture of water and alcohol, is thus removed from the capsules by drainage and evaporation and may be eventually collected and processed by special recovery equipment to meet environmental regulations and requirements for disposal.

If metered amounts of the wetting liquid are selectively applied to the overlapping wall contact areas of the cap and body portions of the capsules, as by spraying the liquid against the capsule side wall adjacent the seam of the body and cap portions, the use of and removal of excess wetting liquid from the outer wall surface of the capsule may be avoided. In such cases, the capsules may be immediately subjected to thermal treatment for final heat seal of the capsule without drying. Metered spraying to apply to wetting liquid is disclosed and described in the aforesaid U.S. Pat. No. 4,539,060 and the referred to co-pending U.S. patent application commonly owned with the present application.

In commercial manufacture of hard gelatin medicinal capsules, it is obviously desirable to fill, close, and seal the capsules containing medicaments in a continuous, economical, and expedient manner. As such, it is desirable to fill, close, and thermally treat the capsules in a continuous operation.

BRIEF OBJECTS OF THE PRESENT INVENTION

It is an object of the present invention to provide improved method and apparatus for thermal treatment of medicinally filled gelatin capsules to effect seal of their overlapped cap and body side wall portions.

It is another object to provide improved method and apparatus for continuously conveying and heating gelatin capsules which have been previously wetted with a wetting agent, to impart thermal energy thereto and cause heat seal of the overlapped cap and body side wall portions to ensure positive retention of medicaments and facilitate their tamper-resistance.

It is a further object to provide improved apparatus for the application of thermal energy to medicinally filled gelatin capsules which is compatible with and may be used in-line high-speed capsule-filling and thermal-sealing operations in the production of the same.

SUMMARY OF THE INVENTION

The invention involves improved method and apparatus for continuously conveying medicinally filled capsules previously wetted with a sealing or wetting agent while applying thermal energy thereto to cause sealing of the capsule caps and body portions in a fast, efficient, and economical manner. The apparatus comprises an elongate housing defining an angularly downwardly directed cylindrical passageway having an upper inlet for continuous receipt of wetted capsules, and a lower outlet for continuous discharge of the fused capsules after thermal treatment in the passageway. The capsules are conveyed through the cylindrical passageway from inlet to outlet by a series of generally circular perforous plates supportably mounted on a rotatable shaft in spaced relation. The plates have ramp portions which extend to interconnect the surfaces of adjacent plates so as to form an Archimedean screw-shaped path of movement for the capsules through the passageway from inlet to outlet. The passageway of the housing is provided continuously with heated air which is recirculated through the passageway to apply sufficient thermal energy to the capsules to effect heat seal of their cap and body portions. Capsules exiting the passageway are collected for subsequent packaging and shipment.

The apparatus further includes an air fan or blower, a shaft drive motor, a heating unit, and conduits for circulating heated air through the housing passageway and for conveying the capsules through the heating apparatus. These components may be variably controlled to provide the desired thermal energy to seal the capsules during their passage.

BRIEF DESCRIPTION OF THE DRAWINGS

The above objects, as well as other objects of the present invention, will become more obvious and the invention will be better understood from the following detail description of preferred embodiments thereof, when taken together with the accompanying drawings, in which.

DETAILED DESCRIPTION OF PREFERRED EMBODIMENTS

Figure 1:
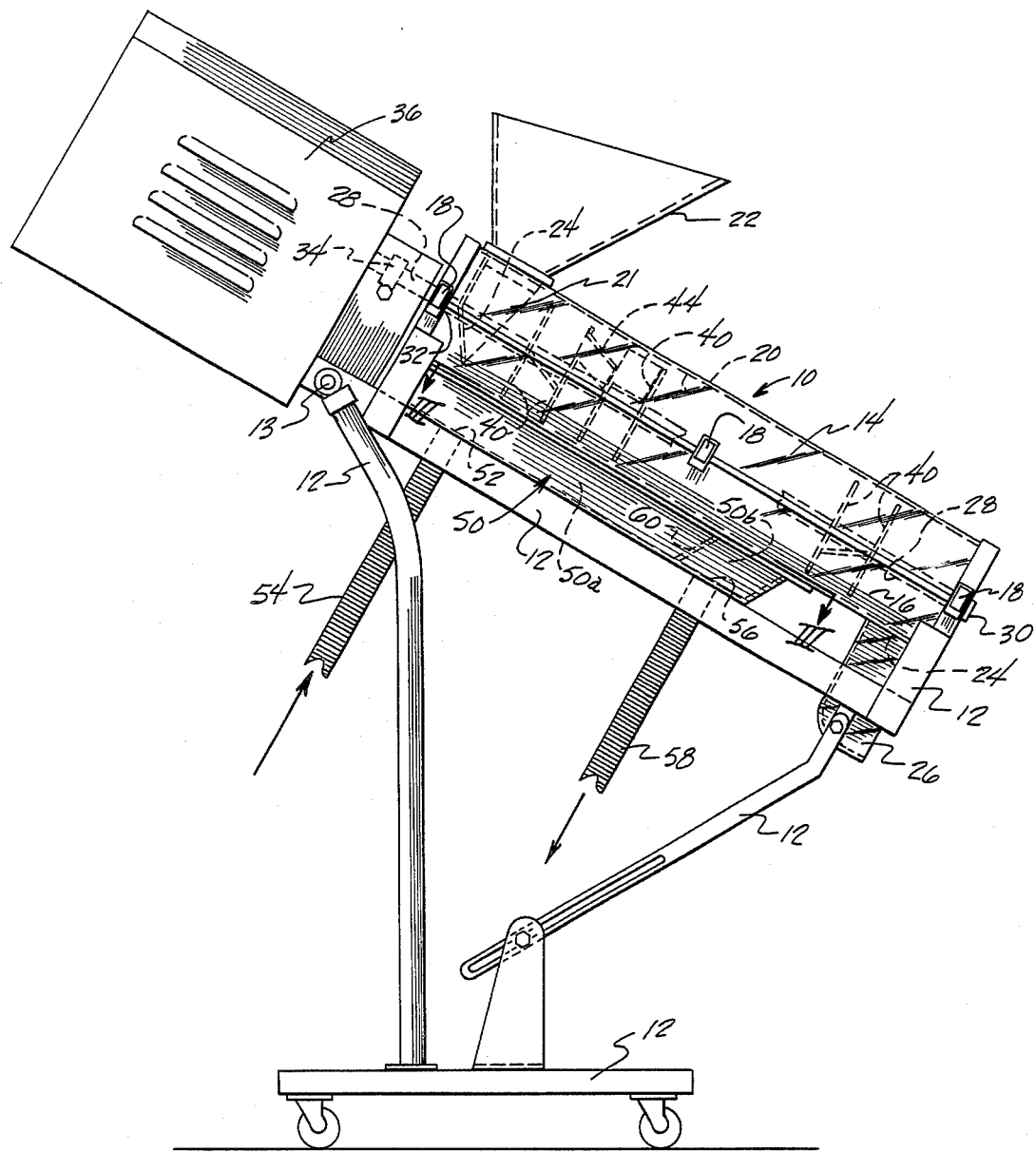
FIG. 1 is a side elevation view of the improved heating apparatus of the present invention.

As best seen in FIG. 1, the improved capsule heat-treating apparatus of the present invention generally consists of an elongate housing 10 of generally cylindrical shape in transverse cross-section. The housing 10 is supported on a suitable support frame 12 for angular adjustment about a pivot pin support member 13. The housing includes upper and lower semi-cylindrical sections 14, 16 which are removably interconnected to each other by fastening clamps 18 to form a cylindrical passageway 20 for the movement of a plurality of medicinally filled gelatin capsules (not shown) having telescoped cap and body portions.

The external configuration of the housing 10 and support frame members is similar to the external construction of a commercially available capsule-polishing machine, Model CD-100, manufactured by Acta Pharmacal Equipment Company of Palo Alto, Calif. In such a polishing machine, capsules are conveyed from a lower inlet of the housing to an upper discharge outlet by rotation of a longitudinally mounted brush driven by a variable speed motor. The brush polishes the outer surface of the capsules as they are pushed by the brush upwardly along a peripheral spring located adjacent the inner periphery of the housing passageway. The present invention is an adaptation and modification of the aforesaid Acta capsule polisher by redesign of the function, use, and internal conveying members of the apparatus for the different purposes set forth hereinafter.

As seen in FIG. 1, the upper end of the housing and cylindrical passageway has a capsule inlet 21 with an upstanding opentop hopper 22 for receipt of medicinally filled capsules into the passageway, and an inner capsule-deflecting wall portion 24 for directing capsules gravitationally fed thereinto into the upper end of the lower portion of the passageway. The lower end of the housing passageway has a capsule-discharge outlet 24 with flow-directing guide plate 26 for discharge of heat-treated capsules from the heat-treating device.

Figure 2:
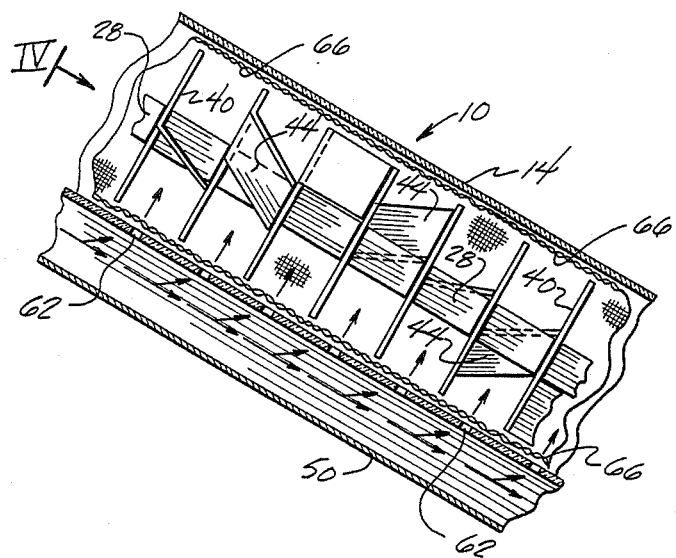
FIG. 2 is an enlarged vertical, sectional elevation view of a mid-section portion of the apparatus of FIG. 1.

As best seen in FIG. 1, and in FIG. 2 (which is a vertical, midline sectional elevation view of a portion of the passageway and housing seen in FIG. 1), mounted on the longitudinal cylindrical axis of the housing passageway is a shaft 28, end portions of which are mounted for rotation in sleeve journals or bearings 30, 32 in the upper and lower end walls of the housing. One end of shaft 28 is connected for rotation to the drive shaft 34 of a variable speed motor 36 supportably mounted on support frame 12 of the apparatus.

Figure 4:
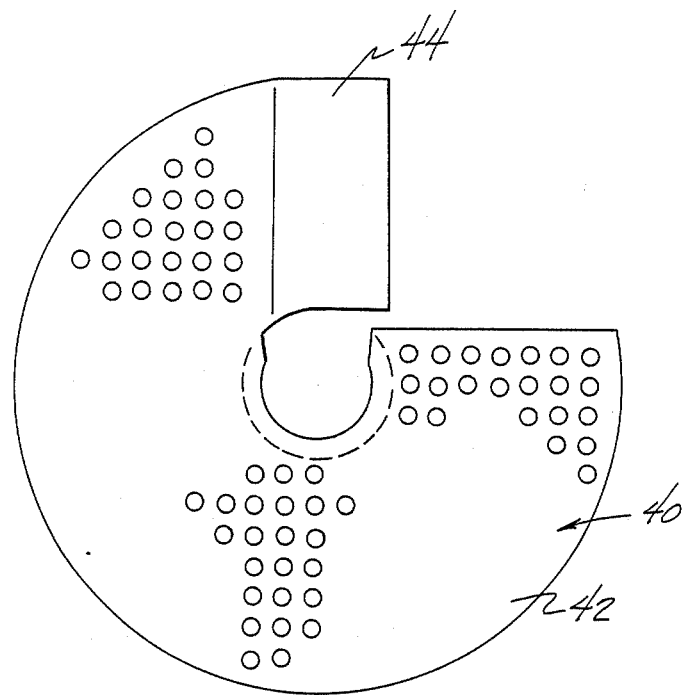
FIG. 4 is an enlarged top plan view of one of the generally circular conveyor plates of the apparatus as seen in FIGS. 1 and 2, and looking generally in the direction of the arrow IV in FIG. 2.
Figure 5:
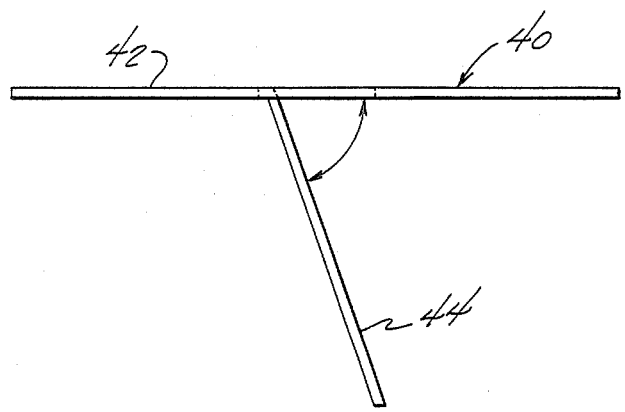
FIG. 5 is a side elevation view of the conveyor plate shown in FIG. 4.

As seen in FIGS. 1 and 2, supportably mounted in spaced relation along the length of shaft 28 from passageway inlet to outlet and for rotation with the shaft are an array of generally circular conveyor plates 40 which extend radially from the shaft to a point adjacent the inside periphery of the cylindrical passageway of the housing 10. Only a portion of the array of plates 40 are illustrated in FIGS. 1 and 2. As best seen in FIGS. 4 and 5, each conveyor plate 40 has a perforated planar surface 42 and a depending ramp portion 44 which is bent out of the plane of the circular plate to extend toward and engage the upper surface of the next adjacent plate on shaft 28 in the direction of passageway outlet 24. The plates 40 are maintained in fixed, spaced relation on the shaft in radial grooves formed in the shaft or by suitable spacer elements mounted on the shaft. As such, it can be seen that the array of plates 40 are located with their ramp portions 44 in spirally staggered relation around the axis of shaft 28 to form a generally Archimedean screw-shaped path through the housing passageway for direction and conveyance of capsules from the passageway inlet to the passageway outlet during rotation of the shaft and plates.

Figure 3:
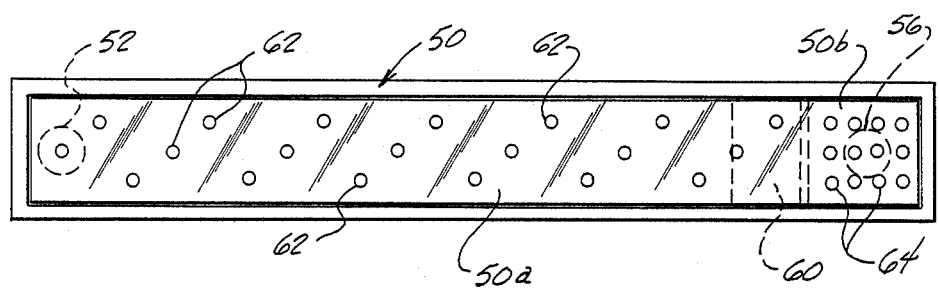
FIG. 3 is a top plan view of an air-distributing and recirculating manifold of the apparatus of FIG. 1, looking in the direction of the arrows III—III therein.

Communicating with an elongate, generally rectangular opening in the center portion of the bottom section 16 of housing 10 are air-distributing means comprising a recirculating manifold 50 having an air inlet 52 connected to an air-inlet conduit 54, and an air outlet 56 connected to an air-discharge conduit 58. Dividing the manifold between its inlet and outlet into first and second sections 50a, 50b is an angular partition wall 60. The upper section 50a of the air-distributing manifold 50 has a plurality of openings 62 (FIG. 3) for introducing air into the housing passageway and path formed by the cooperating circular conveyor plates 40. The lower section 50b of the manifold below partition wall 60 is provided with a plurality of openings 64 for discharge of the air from the housing passageway for recirculation through discharge conduit 58 to a blower fan and heater, as will be explained.

As best seen in FIG. 2, disposed between the inner surface of the outer peripheral wall of the housing 10 and wrapped about the periphery of the array of conveyor plates 40 on shaft 28 is a porous sheet of material, such as a nylon mesh fabric screen 66. The screen fabric 66 is secured about the array of plates for their full extent along the shaft for by suitable means, such as a longitudinal strip of cooperating Velcro ® fastening elements. The screen fabric 66 rotates with the shaft and plate array to contain conveyed capsules along the housing passageway from its inlet to its outlet.

Figure 6:
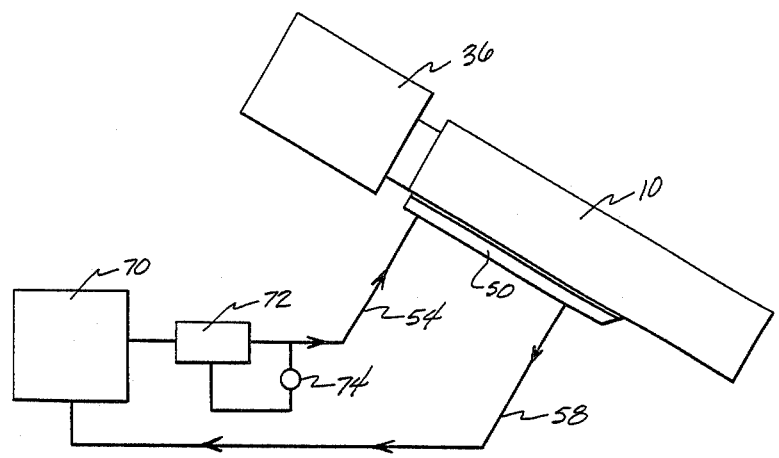
FIG. 6 is a schematic drawing illustrating the operative interconnection of the apparatus of FIG. 1 with associated interconnecting conduits, blower, and air-heater unit for recirculation of heated air through the apparatus.

As best seen in FIG. 6, manifold 50 is connected by the conduits 54 and 58 to a suitable air fan or blower 70 of conventional type, and electrical heater 72 which is thermostatically controlled by temperature sensor 74 to maintain a constant temperature in the air circulated and recirculated by the blower and conduits through the heat-treating apparatus of the invention.

The apparatus of the present invention may be constructed of suitable durable, rigid material, such as metal, plastic, or the like. As seen, the housing 10 forming the cylindrical passageway may be formed of transparent plastic, and the plates 40 may be made of a suitable transparent plastic material to permit observation of capsules passing through the heating device during heat-treatment.

In operation, the capsule heat-treating apparatus of the present invention is disposed with its capsule-receiving hopper 22 adjacent a filled capsule supply position, such as the outlet of a capsule-wetting device which dispenses metered amounts of suitable wetting liquid, such as a water/ethanol solution, between contiguous side wall portions of the cap and body of each capsule. As the capsules are discharged from the wetting device, they gravitationally fall and are directed by the hopper 22 into the upper inlet and the first transverse, or radially disposed, compartment of the housing passageway to rest against and be conveyed by the planar surface of the first adjacent circular conveyor plate 40 and the surrounding fabric screen 66. As the shaft 28 and array of plates 40 are rotated about the central axis of the passageway, the capsules are directed to fall by gravity down the inclined ramp portion of the first plate to be conveyed on the upper surface of the next adjacent plate 40 thereto in the direction of the housing outlet. As the capsules are sequentially conveyed in a generally Archimedean screw-shaped path by the cooperating plates 40 and fabric screen 60, heated air at a desired temperature is continuously circulated and recirculated through the passageway and capsule path to impart sufficient thermal energy to seal the wetted overlapped telescoping side wall portions of the cap and body of each capsule. Upon reaching the end of the housing passageway, the capsules fall by gravity through the discharge outlet 24 and are directed by guide plate 26 into a receiving container or onto a conveying surface for subsequent treatment and/or packaging.

By controlling the speed of rotation of the shaft and circular plate array, the temperature of heated air, and its rate of circulation through the housing, the thermal energy imparted to the capsules may be varied to ensure proper sealing of the capsules without damage to their component parts. The heat-treating device of the present invention is of generally economical construction and operation, and may be used to continuously heat-treat gelatin capsules, after wetting, in their manufacture.

That which is claimed is:

1. Improved apparatus for heat-treating gelatin capsules containing a medicament to seal the telescoped cap and body portions thereof comprising a housing defining an elongate generally cylindrical passageway extending in sloping downward direction and having an inlet at its upper end portion for receipt of a plurality of gelatin capsules and an outlet at its lower end portion for discharging a plurality of gelatin capsules therefrom; capsule-conveying means comprising an elongate shaft extending along the longitudinal cylindrical axis of the passageway and mounted on the housing for rotation about said axis, a plurality of generally circular conveyor plates supportably mounted in spaced relation along the shaft and extending generally radially outwardly thereof for rotation therewith, each of said conveyor plates including a ramp portion extending to communicate with the top surface of the next adjacent plate thereto in the direction of the housing passageway outlet to define a generally Archimedean screw-shaped path for the passage of gelatin capsules through the housing passageway from said inlet to said outlet, air-distributing means attached to said housing and having a first section communicating with said passageway along a first portion of its length, first conduit means for connecting said first section of said air-distributing means to a source of pressurized heated air to discharge heated air into the passageway adjacent the inlet of the passageway for circulation in said path to heat capsules passing therealong, said air-distributing means including a second section communicating with said passageway and adjacent the outlet of the passageway and having an air outlet for discharging heated air from the passageway and air-distributing means, and a flexible porous material enclosing the periphery of said plurality of plates to enclose the same during rotation of the shaft and plates to convey the capsules along said path.

2. Improved apparatus for heat-treating gelatin capsules containing a medicament to seal the telescoped cap and body portions thereof comprising a housing defining an elongate generally cylindrical passageway extending in sloping downward direction and having an inlet at its upper end portion for receipt of a plurality of gelatin capsules and an outlet at its lower end portion for discharging a plurality of gelatin capsules therefrom; capsule-conveying means comprising an elongate shaft extending along the longitudinal cylindrical axis of the passageway and mounted on the housing for rotation about said axis, a plurality of generally circular conveyor plates supportably mounted in spaced relation along the shaft and extending generally radially outwardly thereof for rotation therewith, each of said conveyor plates including a ramp portion extending to communicate with the top surface of the next adjacent plate thereto in the direction of the housing passageway outlet to define a generally Archimedean screw-shaped path for the passage of gelatin capsules through the housing passageway from said inlet to said outlet, air-distributing means attached to said housing and having a first section communicating with said passageway along a first portion of its length, first conduit means for connecting said first section of said air-distributing means to a source of pressurized heated air to discharge heated air into the passageway adjacent the inlet of the passageway for circulation in said path to heat capsules passing therealong, said air-distributing means including a second section communicating with said passageway and adjacent the outlet of the passageway and having an air outlet for discharging heated air from the passageway and air-distributing means, and each of said generally circular plates having a plurality of perforations to facilitate circulation of heated air along said housing passageway.

3. Apparatus as defined in claim 1 or 2 including air blower means having an air inlet and an air outlet, an air heater, and said first conduit means connected to the blower means outlet and operatively connected to the air heater for circulation of heated air through said air-distributing means and housing passageway to heat capsules conveyed therealong to a desired temperature to effect heat-seal the overlapping side walls of the caps and bodies of capsules passing therethrough.

4. Apparatus as defined in claim 3 including second conduit means connecting said air-distributing means outlet to said blower means inlet for recirculation of heated air through said housing passageway for heat-treatment of capsules passing through the passageway from its inlet to outlet.

5. Apparatus as defined in claim 4 including motor means attached to said shaft for rotation thereof, and wherein said blower means, air heater, and motor means are variably adjustable to variably control the amount of thermal energy applied to capsules passing through said housing passageway during their heat-treatment.

6. Apparatus as defined in claim 1 or 2 including motor means attached to said shaft for rotation thereof.

7. Apparatus as defined in claim 6 wherein said motor means is a variable speed motor.

8. Apparatus as defined in claim 1 or 2 including hopper means communicating with said passageway inlet for receipt and direction of a plurality of capsules thereinto.

9. Apparatus as defined in claim 1 or 2 wherein said first section of said air-distributing means includes a plurality of air discharge openings communicating with said housing along a substantial portion of its length to introduce heated air to the housing passageway and portions of said path between said spaced conveyor plates, and said air-distributing means second section having a plurality of air inlet openings for withdrawing air from said passageway at a location adjacent the said capsule discharge outlet of the passageway.

* * * * *